(12) United States Patent
Lin

(10) Patent No.: US 6,467,515 B1
(45) Date of Patent: Oct. 22, 2002

(54) GAS CONTAINER

(76) Inventor: Hwai-Tay Lin, Akara Building, 24 De Castro Street, Wickhams Cay I, Road Town, Tortola (VG)

( * ) Notice: Subject to any disclaimer, the term of this patent is extended or adjusted under 35 U.S.C. 154(b) by 0 days.

(21) Appl. No.: 09/997,342

(22) Filed: Nov. 29, 2001

(51) Int. Cl.[7] .................................................. B65B 1/04
(52) U.S. Cl. ...................... 141/351; 141/20; 137/614.17
(58) Field of Search ............................. 141/2, 18, 3, 20, 141/348–353, 360–375; 137/614.17, 614.04, 611.11

(56) References Cited

U.S. PATENT DOCUMENTS

| | | | |
|---|---|---|---|
| 3,343,718 A | * | 9/1967 | Siegel et al. .................. 141/20 |
| 5,413,230 A | * | 5/1995 | Folter et al. ................. 137/544 |
| 5,560,405 A | * | 10/1996 | Harris et al. ............ 137/614.04 |
| 5,669,426 A | * | 9/1997 | Fontaine, Jr. .......... 137/614.17 |

* cited by examiner

Primary Examiner—Steven O. Douglas
(74) Attorney, Agent, or Firm—Alan Kamrath; Rider, Bennett, Egan & Arundel, LLP

(57) ABSTRACT

A gas container comprises a container including a main chamber for containing flammable gas. The container comprises a valve seat in an end thereof, the valve seat defining a chamber communicated with the main chamber. A cover is mounted to close the end of the container. The cover includes an outlet communicated with the chamber of the valve seat. A valve stem is mounted in the valve seat and slidable between a closed position not allowing the flammable gas to exit the outlet through the chamber and an open position allowing the flammable gas to exit the outlet through the chamber. The valve stem is actuatable by an object extending into the valve seat via the outlet of the cover so as to be moved from the closed position to the open position.

16 Claims, 5 Drawing Sheets

A - A

A – A

A - A

GAS CONTAINER

BACKGROUND OF THE INVENTION

1. Field of the Invention

The present invention relates to a gas container with improved safety. In particular, the present invention provides a gas container having a hidden type valve stem mounted therein to thereby prevent undesired dispensing of the gas in the gas container resulting from inadvertent actuation of the valve stem that controls dispensing of the gas in the gas container.

2. Description of the Related Art

Gas containers containing flammable gas are useful in refueling lighters, portable gas stoves, torches, etc. A typical gas container comprises a valve stem having an end exposed outside the container. When refueling, e.g., such as a lighter, the exposed end of the valve stem is inserted into a valve of a gas chamber of the lighter. The exposed end of the valve stem is stopped by a wall defining the gas chamber of the lighter and thus retracted into the gas container to open an outlet of the gas container, thereby allowing the gas in the gas container to be dispensed into the gas chamber of the lighter. After refueling, the gas container together with the exposed end of the valve stem is removed from the lighter, and the valve stem returns to its initial position to thereby close the outlet of the gas container. However, the exposed end of the valve stem tends to be impinged and thus opens the outlet of the gas container. Undesired dispensing of gas occurs. A removable cover has been proposed to cover the exposed end of the valve stem of the gas container, yet the problem arises again when the cover is removed.

SUMMARY OF THE INVENTION

An object of the present invention is to provide a gas container having a hidden type valve stem mounted therein to thereby prevent undesired dispensing of the gas in the gas container resulting from inadvertent actuation of the valve stem that controls dispensing of the gas in the gas container.

A gas container in accordance with the present invention comprises a container including a main chamber for containing flammable gas. The container comprises a valve seat in an end thereof, with the valve seat defining a chamber communicated with the main chamber. A cover is mounted to close the end of the container. The cover includes an outlet communicated with the chamber of the valve seat. A valve stem is mounted in the valve seat and is slidable between a closed position not allowing the flammable gas to exit the outlet through the chamber and an open position allowing the flammable gas to exit the outlet through the chamber. The valve stem is actuatable by an object extending into the valve seat via the outlet of the cover so as to be moved from the closed position to the open position Thus, since the valve stem is hidden inside the container, it will not be actuated inadvertently. Undesired dispensing of the flammable gas is avoided accordingly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
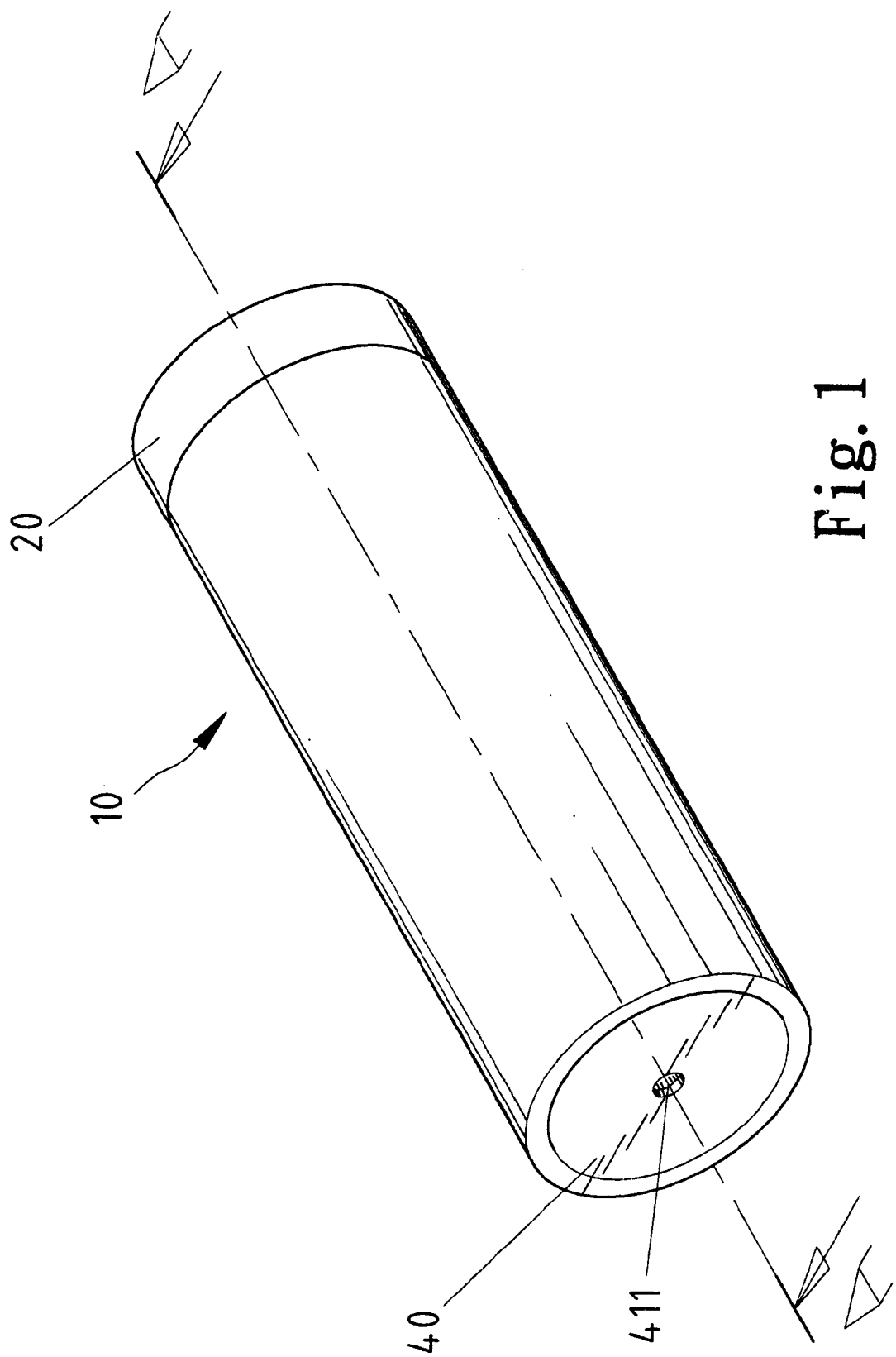
FIG. 1 is a perspective view of a gas container in accordance with the present invention.
Figure 2:
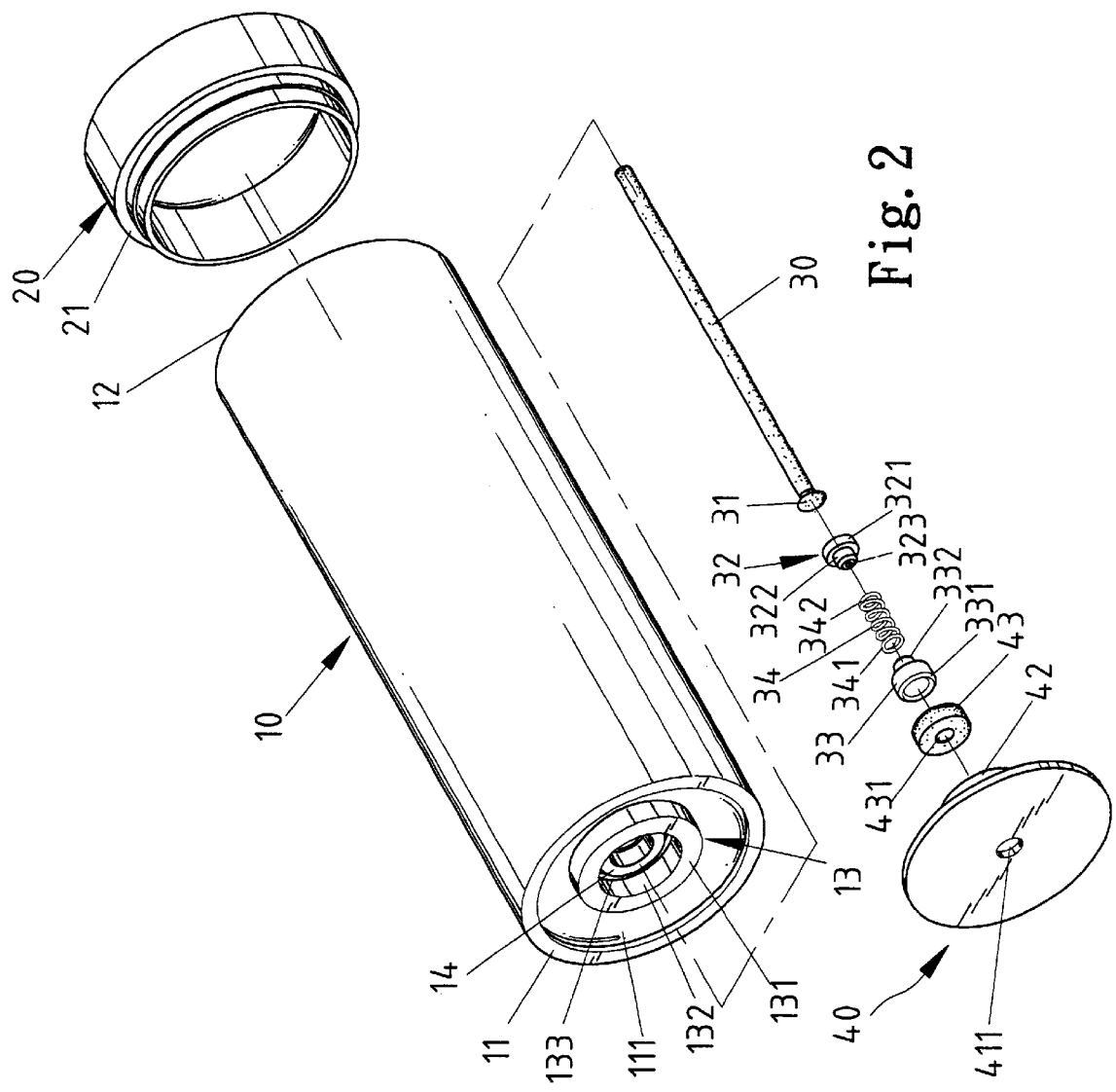
FIG. 2 is an exploded perspective view of the gas container in accordance with the present invention.

Referring to FIGS. 1 through 4, a gas container in accordance with the present invention generally comprises a container 10 having a first end 11 and a second end 12. An end cap 20 includes a stepped portion 21 for engaging with the second end 12 of the container 10, thereby closing the second end 12 of the container 10. A main chamber 15 is defined in the container 10 for containing flammable gas, such as liquefied petroleum gas.

Figure 3:
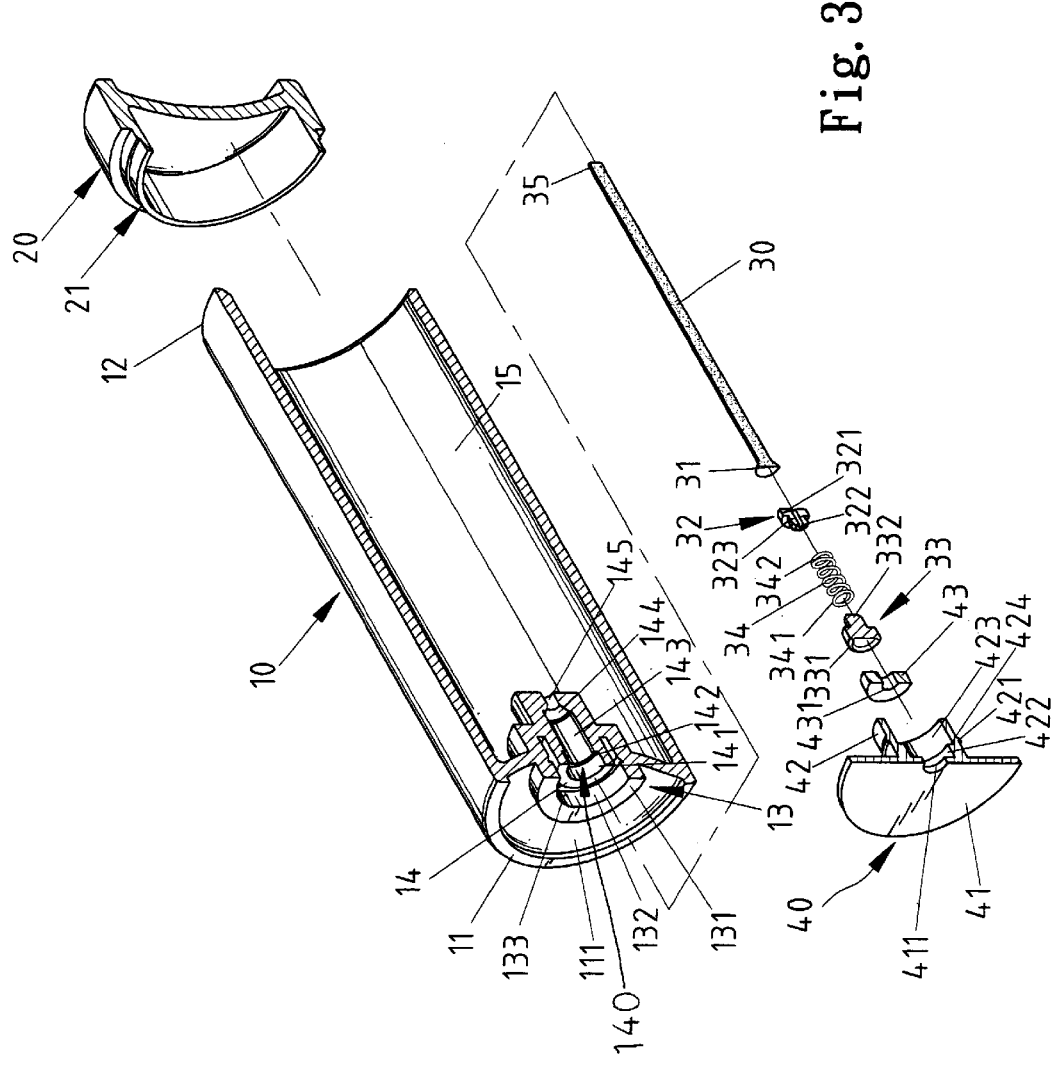
FIG. 3 is an exploded perspective view, partly cutaway, of the gas container in accordance with the present invention.
Figure 4:
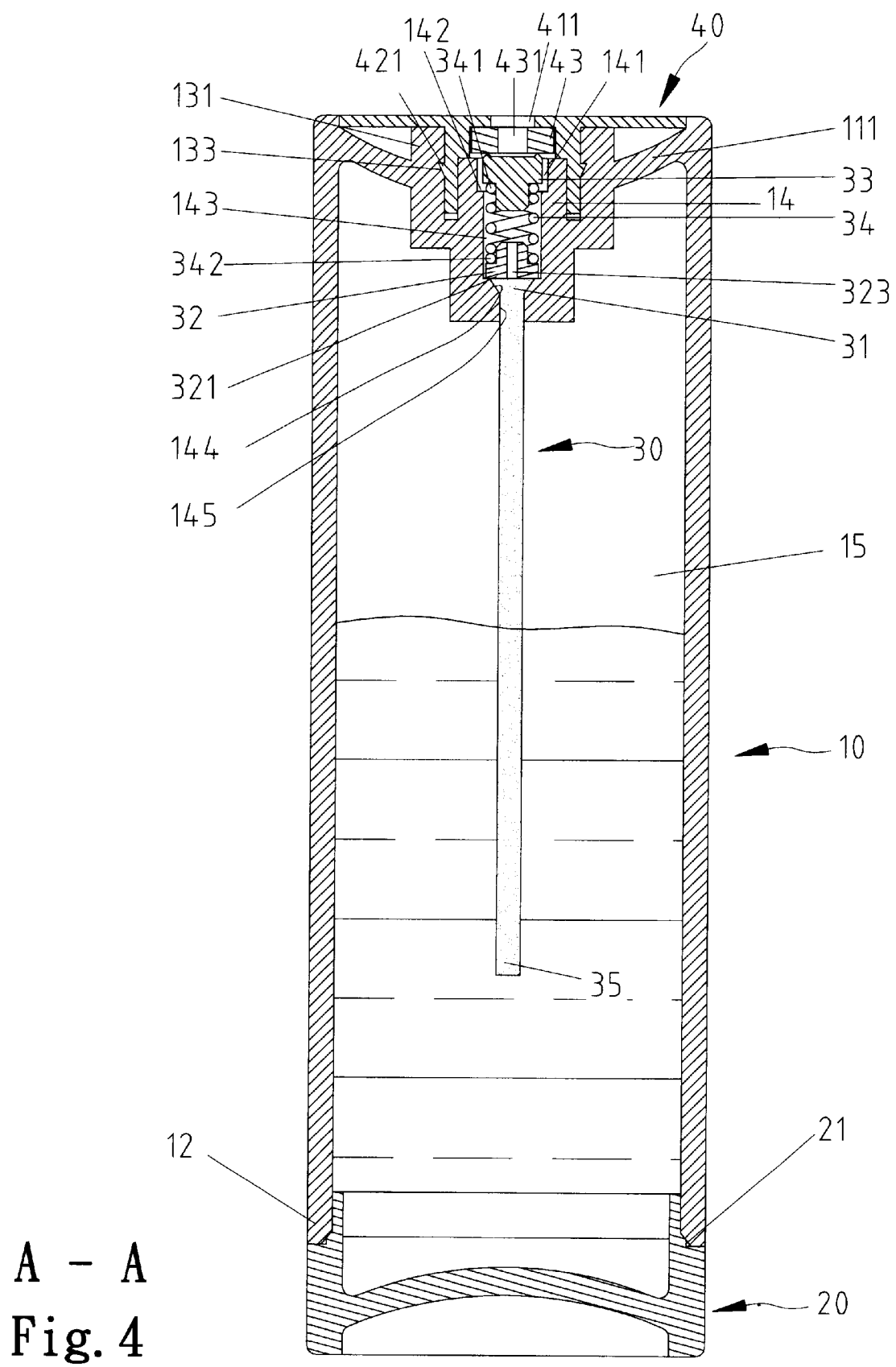
FIG. 4 is a sectional view taken along plane A—A in FIG. 1.

A valve seat 13 is mounted in the first end 11 of the container 10. In this embodiment, the valve seat 13 comprises an outer annular wall 131 that is supported by a web 111, which, in turn, is integrally formed with the outer annular wall 131 and container 10. A first chamber 132 is defined in the outer annular wall 131, and an engaging groove 133 is defined in an inner periphery of the outer annular wall 131. An inner annular wall 14 is formed on a bottom wall defining the first chamber 132. In this embodiment, as illustrated in FIGS. 3 and 4, the inner annular wall 14 extends into the main chamber 15 of the container 10 to a position beyond the outer annular wall 131 and defines a second chamber 140 that is communicated with the first chamber 132. The second chamber 140 comprises, in sequence, an outer portion 141, an intermediate portion 143 having an inner diameter smaller than that of the outer portion 141, a conic portion 144, and an inner portion 145 having an inner diameter smaller than that of the intermediate portion 143, best shown in FIG. 4. A shoulder 142 is formed between the outer portion 141 and the intermediate portion 143 of the second chamber 140, and the inner portion 145 is communicated with the main chamber 15 of the container 10.

A gas-transmitting member 30 has an enlarged end 31 engaged in and thus sealing with the conic portion 144 of the second chamber 140. The gas-transmitting member 30 extends through the inner portion 145 of the second chamber 140 with a second end 35 of the gas-transmitting member 30 located in the main chamber 15 of the container 10. In this embodiment, the gas-transmitting member 30 is a solid cotton sliver for absorbing the liquefied petroleum gas. Nevertheless, the gas-transmitting member 30 can be a tube or other equivalent.

A block 32 is mounted in the intermediate portion 143 of the second chamber 140 and rests on the enlarged end 31 of the gas-transmitting member 30 at an end 321 thereof. The block 32 has a bore 323 that is in contact with the gas-transmitting member 30, thereby allowing gaseous liquefied petroleum gas to pass therethrough. An elastic element 34 has an end 342 attached to the other end 322 of the block 32. A valve stem 33 is mounted in the outer portion 141 of the second chamber 140 and has a first end 331 and a second end 332 to which the other end 341 of the elastic element 34 is attached, best shown in FIG. 4.

A cover 40 is substantially a disc 41 mounted to close the first chamber 132 defined inside the outer annular wall 131. A hollow cylindrical member 42 projecting from a side of the disc 41 is engaged in a space between the inner annular wall 14 and the outer annular wall 131. An inverted hooked portion 421 is formed on an outer periphery of the hollow cylindrical member 42. The inverted hooked portion 421 snaps into the engaging groove 133 in the inner periphery of the outer annular wall 131, best shown in FIG. 4. This allows rapid assembly. The cover 40 includes an outlet 411 for communicating the first chamber 132 with outside. The hollow cylindrical member 42 further includes a first space 422 adjacent to and communicated with the outlet 411 and a second space 423 having an inner diameter greater than that of the first space 422. The first space 422 and the second space 423 are communicated with each other and have a shoulder 424 formed therebetween. A sealing member 43 is mounted in the first space 422 and located between the valve stem 33 and the cover 40 and includes a passage 431 communicated with the outlet 411. The outer annular wall 131 is received in the second space 423. As illustrated in FIG. 4, the sealing member 43 is urged by the valve stem 33 biased by the elastic element 34 to press against the cover 40. Thus, the first space 422 in the cover 40 is normally not communicated with the passage 431 of the sealing member 43. As a result, it is impossible for the valve stem 33 hidden in the container 10 to be inadvertently actuated. Undesired dispensing of the gas in the container 10 is avoided accordingly.

Figure 5:
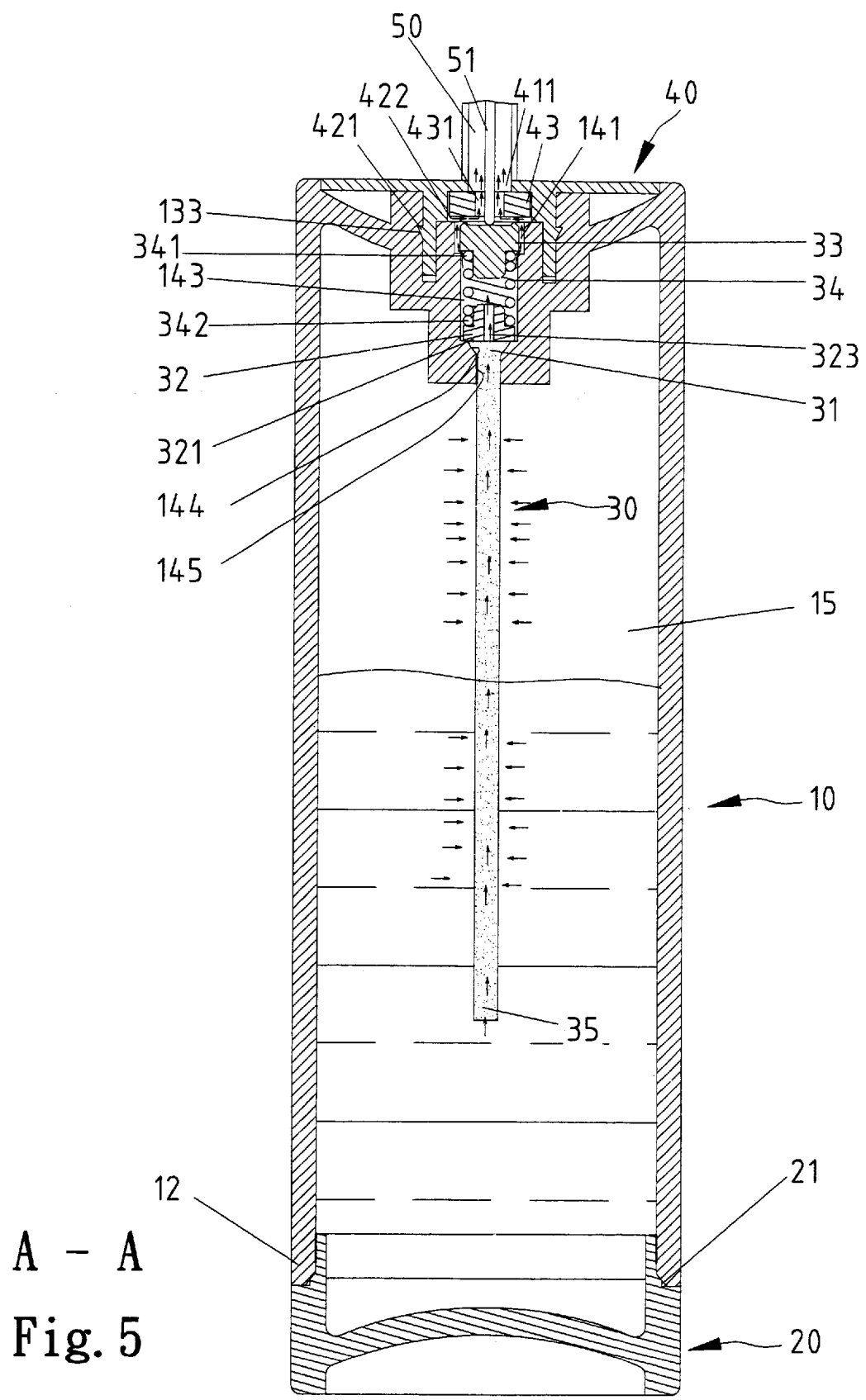
FIG. 5 is a sectional view similar to FIG. 4, illustrating operation of the gas container in accordance with the present invention.

Referring to FIG. 5, when refueling an article having a refueling tube 50 and a needle 51, the refueling tube 50 houses the outlet 411 of the cover 40, and the needle 51 is inserted into the outlet 411 and the passage 431 to push the valve stem 33. The valve stem 33 moves inward and compresses the elastic element 34. A gap is formed between the sealing member 43 and the valve stem 33. Thus, due to the pressure difference between the atmosphere and the main chamber 15, the high-pressure liquefied petroleum gas in the main chamber 15 flows into the intermediate portion 143 of the second chamber 140 via the gas-transmitting member 30 and the bore 323 of the block 32. At this time, the liquefied petroleum gas vaporizes and thus becomes gaseous and then flows into the refueling tube 50 through the outer portion 141, the gap between the sealing member 43 and the valve stem 33, the passage 431 of the seating member 43, and the outlet 411 of the cover 40 via the gas-transmitting member 30 and the bore 323 of the block 32. At this time, the liquefied petroleum gas vaporizes and thus becomes gaseous and then flows into the refueling tube 50 through the outer portion 141, the gap between the sealing member 43 and the valve stem 33, the passage 431 of the sealing member 43, and the outlet 411 of the cover 40.

According to the above description, it is appreciated that the valve stem 33 that controls dispensing of the gas in the gas container is mounted inside the container 10 and thus avoids inadvertent actuation and the resultant undesired dispensing of gas in the gas container. The elements of the gas container can be assembled quickly, and the elements in the valve seat 13 are protected by the cover 40.

Although the invention has been explained in relation to its preferred embodiment, it is to be understood that many other possible modifications and variations can be made without departing from the scope of the invention as hereinafter claimed.

What is claimed is:

1. A gas container comprising:
   a container including a main chamber for containing flammable gas, the container comprising a valve seat in an end thereof, the valve seat defining a chamber communicated with the main chamber, wherein the valve seat comprises an annular outer wall having an engaging groove;
   a cover mounted to close the end of the container, the cover including an outlet communicated with the chamber of the valve seat, with the cover comprising a disc in which the outlet is defined, with the cover further comprising a hollow cylindrical member extending from a side of the disc, with the hollow cylindrical member comprising an inverted hooked portion for engaging with the engaging groove of the annular outer wall; and
   a valve stem mounted in the valve seat and slidable between a closed position not allowing the flammable gas to exit the outlet through the chamber and an open position allowing the flammable gas to exit the outlet through the chamber, the valve stein being actuatable by an object extending into the valve seat via the outlet of the cover so as to be moved from the closed position to the open position.

2. The gas container as claimed in claim 1, wherein the annular outer wall defines a first chamber communicated with the outlet of the cover, a bottom wall defining the first chamber comprising an annular inner wall formed thereon, the hollow cylindrical member being securely received in a space between the annular outer wall and the annular inner wall.

3. The gas container as claimed in claim 2, wherein the annular inner wall defines a second chamber therein, the second chamber being communicated between the first chamber and the main chamber, the valve stem being slidably mounted in the second chamber, with the gas container further comprising an elastic element mounted in the second chamber for biasing the valve stem to the closed position.

4. The gas container as claimed in claim 3, wherein the second chamber comprises in sequence an outer portion adjacent to the outlet of the cover, an intermediate portion having an inner diameter smaller than that of the outer portion, a conic portion, and an inner portion having an inner-diameter smaller than that of the intermediate portion, with the gas container further comprising a gas-transmitting member for guiding the flammable gas in the main chamber to the second chamber.

5. The gas container as claimed in claim 4, wherein the gas-transmitting member is a cotton sliver, and wherein the flammable gas is liquefied petroleum gas.

6. The gas container as claimed in claim 4, wherein the gas-transmitting member comprises an enlarged end securely engaged in the conic portion of the second chamber.

7. The gas container as claimed in claim 4, further comprising a block mounted in the intermediate portion of the second chamber, the block including an end to which the elastic element is attached, the block farther including a bore through which the flammable gas from the main chamber flows into the first chamber.

8. The gas container as claimed in claim 7, wherein the valve stem is received in the outer portion of the second chamber and comprises an end to which the elastic element is attached.

9. The gas container as claimed in claim 8, wherein the hollow cylindrical member comprises a first space adjacent to and communicated with the outlet of the disc, the hollow cylindrical member further comprising a second space communicated with the first space, the annular inner wall being, received in the second space.

10. The gas container as claimed in claim 9, further comprising a sealing member mounted in the first space of the hollow cylindrical member, the sealing member including a passage communicated with the outlet of the disc, the valve stem being biased by the elastic element to press against the sealing member and thus close the passage, the valve stem being actuatable by the object extending into the valve seat via the outlet of the cover so as to be moved from the closed position to the open position such that a gap is formed between the sealing member and the valve stem, thereby allowing flow of the flammable gas from the main chamber to the outlet of the disc via the passage.

11. A gas container comprising:

a container including a main chamber for containing flammable gas, the container comprising a valve seat in an end thereof, wherein the valve seat comprises an outer wall defining a first chamber, a bottom wall defining the first chamber comprising an inner wall formed thereon, the inner wall defining a second chamber that is communicated between the first chamber and the main chamber;

a cover mounted to close the end of the container, the cover including an outlet communicated with the first chamber of the valve seat;

a valve stem mounted in the valve seat and slidable between a closed position not allowing the flammable gas to exit the outlet through the first chamber and an open position allowing the flammable gas to exit the outlet through the first chamber, the valve stem being actuatable by an object extending into the valve seat via the outlet of the cover so as to be moved from the closed position to the open position, the valve stem being slidably mounted in the second chamber; and an elastic element mounted in the second chamber for biasing the valve stem to the closed position.

12. The gas container as claimed in claim 11, wherein the second chamber comprises in sequence an outer portion adjacent to the outlet of the cover, an intermediate portion having an inner diameter: smaller than that of the outer portion, a conic portion, and an inner portion having an inner diameter smaller than that of the intermediate portion, with the gas container further comprising a gas-transmitting member for guiding the flammable gas in the main chamber to the second chamber.

13. The gas container as claimed in claim 12, wherein the gas-transmitting member is a cotton sliver, and wherein the flammable gas is liquefied petroleum gas.

14. The gas container as claimed in claim 12, wherein the gas-transmitting member comprises an enlarged end securely engaged in the conic portion of the second chamber.

15. The gas container as claimed in claim 12, further comprising a block mounted in the intermediate portion of the second chamber, the block including an end to which the elastic element is attached, the block further including a bore through which the flammable gas from the main chamber flows into the first chamber.

16. The gas container as, claimed in claim 15, wherein the valve stem is received in the outer portion of the second chamber and comprises an end to which the elastic element is attached.

* * * * *